Patented Oct. 8, 1935

UNITED STATES PATENT OFFICE 2,016,495

WATER-INSOLUBLE AZO-DYESTUFFS

Hans Heyna and Hans Huber, Frankfort-on-the-Main, Germany, assignors to General Aniline Works, Inc., New York, N. Y., a corporation of Delaware No Drawing. Application June 20, 1934, Serial No. 731,534. In Germany June 23, 1933

3 Claims. (Cl. 260—91)

The present invention relates to water-insoluble azo-dyestuffs; more particularly it relates to dyestuffs of the following general formula:

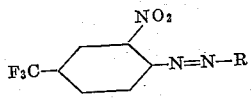

wherein R means the radical of a 2-hydroxy-naphthalene or of a compound containing a —CH₂—CO-group by means of which it is capable of being combined with diazo compounds, such as a pyrazolone or an acyl acetic arylide.

We have found, that technically valuable pigment dyes are obtainable by coupling in substance or on a substratum the diazo compound of 1-amino-2-nitro-4-benzotrifluoride with a 2-hydroxynaphthalene, an acyl acetic arylide or a pyrazolone derivative not containing groups rendering the dyestuffs soluble in water, such as sulfonic or carboxylic acid groups.

The new dyestuffs are distinguished by a good fastness to oils and a very good fastness to light. As regards the fastness to light they surpass the azo-dyestuffs described in German Patent 551,882, and obtainable by coupling diazotized 1-amino-5-benzotrifluorides substituted by chlorine in o-position to the amino group with 2,3-hydroxynaphthoic acid arylides.

The following examples serve to illustrate the invention, but they are not intended to limit it thereto.

(1) The diazo solution prepared from 20.6 kilos of 1-amino-2-nitro-4-benzotrifluoride is run, while stirring, into an ice-cold finely divided suspension of 15 kilos of beta-naphthol in the presence of sodium acetate. The precipitated dyestuff is filtered, pressed and dried. It forms an orange-red powder of good fastness to oils and very good fastness to light. The dyestuff has the following formula:

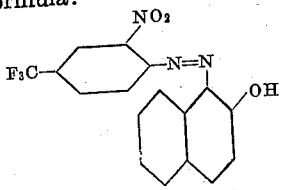

(2) The diazo solution prepared from 20.6 kilos of 1-amino-2-nitro-4-benzotrifluoride is combined with a cold aqueous solution of 17.8 kilos of aceto-acetic anilide and 13 kilos of caustic soda solution. In order to accelerate the reaction, sodium acetate is advantageously added to the mixture. When the coupling is finished, the dyestuff is filtered by suction, washed and dried. It forms a yellow powder and corresponds to the formula:

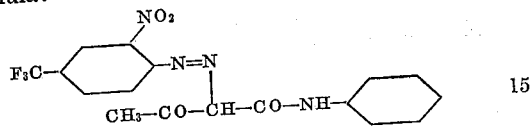

Instead of aceto-acetic anilide other acyl acetic arylides may be used.

(3) The diazo solution prepared from 20.6 kilos of 1-amino-2-nitro-4-benzotrifluoride is run into a cold finely divided suspension, prepared by dissolving 18 kilos of 1-phenyl-3-methyl-5-pyrazolone in dilute caustic soda solution and precipitating with dilute mineral acid. In order to accelerate the coupling, sodium acetate is added to the mixture. The dyestuff is filtered by suction, washed and dried; it forms an orange powder and corresponds to the formula:

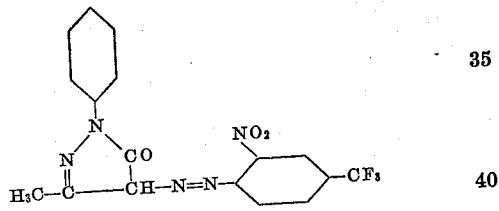

Instead of methylphenylpyrazolone other pyrazolone derivatives may be used as coupling components.

The following dyestuffs, among others, are capable of production in accordance with this invention:

| | Diazo compound from— | Combined with— | Shade of the dyestuff |
|---|---|---|---|
| 1 | 1-amino-2-nitro-4-benzotrifluoride | 6-chloro-2-naphthol | Orange. |
| 2 | do | 8-chloro-2-naphthol | Yellowish orange. |
| 3 | do | Acetoacetic-o-chloro-anilide | Yellow. |
| 4 | do | Acetoacetic-m-xylidide | Greenish yellow. |
| 5 | do | Benzoylacetic anilide | Yellow. |
| 6 | do | Benzoylacetic-o-chloro-anilide | Do. |
| 7 | do | Benzoylacetic-m-nitranilide | Do. |
| 8 | do | Benzoylacetic 1-amino-2-methoxy-4-chloro-5-methyl-benzene. | Do. |
| 9 | do | 3-methyl-5-pyrazolone | Orange. |
| 10 | do | 1-methyl-3-phenyl-5-pyrazolone | Do. |
| 11 | do | 1,3-diphenyl-5-pyrazolone | |

Since an object of the present invention is to provide dyestuffs of good fastness properties which dyestuffs are insoluble in water and alkalies, it is to be understood that the aromatic nuclei of the general formulae appearing in the appended claims do not contain any substituents which are known to render the dyestuffs soluble in water or alkalies and to tend to depreciate the fastness of the dyestuffs to alkalies. Substituents of this kind are, for instance, the sulfonic acid and the carboxylic acid group.

We claim:

1. The water-insoluble azo-dyestuffs of the following formula:

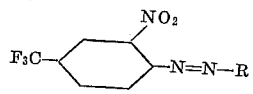

wherein R means the radical of a 2-hydroxy-naphthalene or of a compound containing a —CH₂—CO—group by means of which it is capable of being combined with diazo compounds, being, when dry, yellow to red powders and yielding, when mixed with a substratum, yellow to red lakes of good fastness to oils and very good fastness to light.

2. The water-insoluble azo-dyestuff of the following formula:

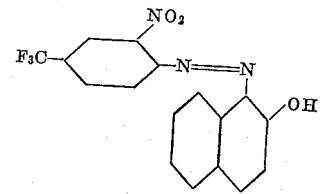

being, when dry, an orange-red powder and yielding, when mixed with a substratum, an orange-red lake of good fastness to oils and very good fastness to light.

3. The water-insoluble azo-dyestuff of the following formula:

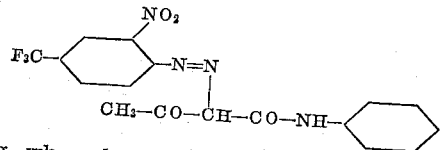

being, when dry, a yellow powder and yielding, when mixed with a substratum, a yellow lake of good fastness to oils and very good fastness to light.

HANS HEYNA.
HANS HUBER.